Dec. 17, 1935. H. ROSENBERG Re. 19,792

FASTENER

Original Filed Dec. 22, 1923

Inventor

Heyman Rosenberg

By Edgar M Kitchin his Attorney.

Reissued Dec. 17, 1935

Re. 19,792

UNITED STATES PATENT OFFICE 19,792

FASTENER

Heyman Rosenberg, New York, N. Y.

Original No. 1,978,329, dated October 23, 1934, Serial No. 682,271, December 22, 1923. Application for reissue November 6, 1935, Serial No. 43,602

15 Claims. (Cl. 85—21)

This invention relates to improvements in art of anchorage and fasteners therefor, such as are especially well adapted for anchorage in metal or the connecting of two pieces of metal, and which are also well adapted for use in conjunction with other materials.

The object in view is the production of a simple and inexpensive, and yet very effective, means of anchorage or connection.

A further object is the achieving of anchorage in the harder metals, such as soft iron and soft steel, by longitudinal stress delivered to a fastener, as by a hammer blow, and thereupon causing the fastener to be anchored in the material of the metal work through modification of such material as distinguished from frictional engagement of a fastener with such work incident to modification of the material of the fastener.

With this and further objects in view as will in part hereinafter become apparent and in part be stated, the invention comprises certain novel constructions, combinations and arrangements of parts as subsequently specified and claimed.

In the accompanying drawing,—

Figure 1:
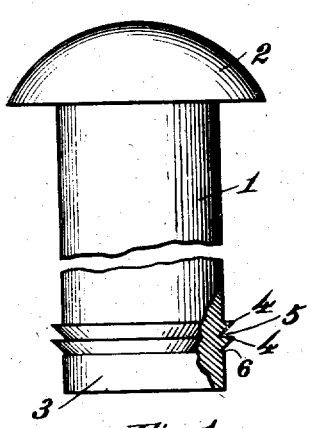

Figure 1 is a view in side elevation of a fastener embodying the features of the present invention, intermediate parts being broken out, and the parts being seen on an exaggerated scale over the sizes ordinarily employed in commerce, the magnification being utilized for clearness of disclosure.

Figures 2, 3, 4, 5, and 6 are views similar to Figure 1 of different slightly modified embodiments thereof.

Figure 3:
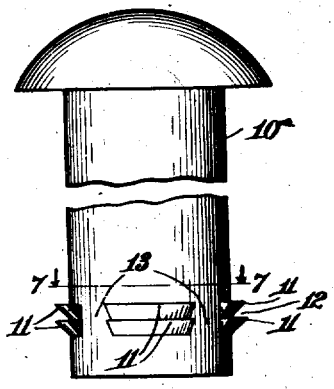
Figure 7:
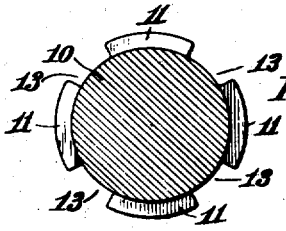

Figure 7 is a transverse section taken on the plane indicated by line 7—7 of Figure 3, and looking downward.

Referring to the drawing by numerals, 1 indicates a pin-like body having a driving head 2 at one end and a pilot 3 forming the terminus of the other end of the body. Immediately above the pilot, that is, in the direction toward the head, the body is formed with outstanding annular ribs 4, 4, lying parallel to each other and at substantially right angles to the longitudinal axis of the body. Between the ribs 4 is an annular valley or depression 5, and below the lower rib is an annular depression 6 forming that portion of a valley extending into the body 1. Each of the ribs 4 has an inclined under face and a flat upper face so that the upper face lies in a single plane intersecting the axis of the pin at right angles. Thus, each rib 4 is a relatively short cone frustum with its base facing upward or in the direction toward the hammer-driven end of the fastener.

The fastener described is preferably formed of iron or steel with the ribs 4 hardened sufficiently for entering the harder metals, such as soft iron or soft steel, substantially without injury to the ribs. Reference herein and in the appended claims to the hardened condition of the ribs 4 is to be understood to include that degree of hardness just mentioned, and to the end of providing this hardened condition, as a matter of facility and commercial practicability, the fastener is preferably formed of soft iron or soft steel and then case-hardened as by the well known cyaniding process.

In operation and in practicing of the art, the fastener may be employed as a means of anchorage directly to a body of hard metal such as steel or iron or other hard flowable material, or as a means of connection of one plate of such material to another, and in either instance an aperture or recess is formed in the material to be engaged, the recess being of a cross sectional area equal to and slightly greater than the cross section of the body 1, but not equal to the diameter of one of the ribs 4, and in the instance of a recess, such recess is formed of a depth equal at least to the distance to which the fastener is to be driven in. The pilot 3 is inserted in such aperture or recess, and the head 4 is driven, as by a hammer blow or other requisite stress, for moving the fastener into the recess or aperture and thereby causing the material engaged to flow or move first sufficiently away from the body 1 to permit the passage of a rib 4, and then to flow back to a position overlapping such rib and to have a similar action with respect to the next rib 4. An interlock is thus effected between the fastener and the material engaged which effectively resists stress tending to withdraw the fastener. It is to be noted that the valley 5 is of a depth sufficient to cause its base to have a diameter less than the diameter of the body 1, and it is also to be understood that reference to direction throughout this specification and the appended claims assumes the fastener to be in an upright position.

Figure 2:
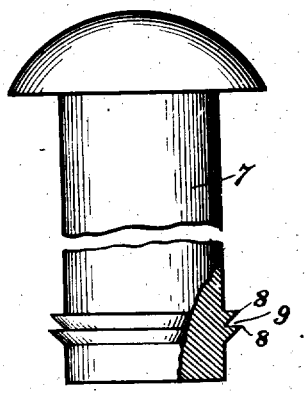

In Figure 2 is illustrated a very slight modification of the fastener from the structure shown and described in Figure 1, in which the body 7, corresponding to the body 1, is provided with the annular ribs 8 of substantially the same form as ribs 4, except that the ribs 8 spring from the surface or periphery of the body 7 and the valley 9 between the ribs, therefore, does not extend within the body itself.

In Figures 3 and 7 is illustrated a still further embodiment of the fastener in which the body 10 is substantially identical with the body 1 of Figure 1, and is provided with ribs 11, 11, with a valley 12 therebetween, but in this instance the ribs are not annular, but are interrupted at a series of places, as indicated at 13. The spaces or interruptions 13 between the segments of the otherwise annular ribs 11 enable portions of the engaged material to remain in place and form interlocking longitudinal ribs with portions overlying the several ends of the several segments making up the ribs 11.

Figure 4:
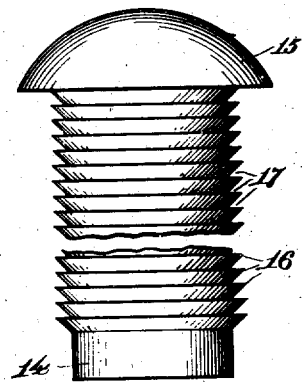

Figure 4 shows a structure identical with the showing in Figure 2 except that a greater number of annular ribs is employed. In this figure, the body of the fastener is provided with the usual pilot 14 and from the upper end of the pilot 14 to the head 15 of the body of the pin-like fastener is provided with outstanding ribs 16, 16. The ribs 16 have the usual valleys 17 separating the same.

Figure 5:
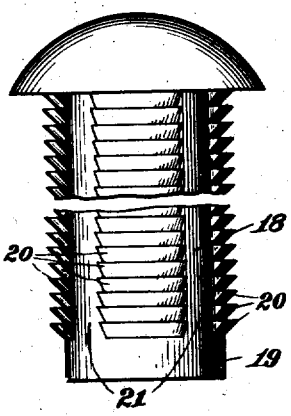

In Figure 5 is shown a structure similar to Figure 4, but differing therefrom in that the ribs are cut away and thus form segments instead of annular ribs. In this figure, 18 indicates the body of the fastener having the pilot 19, and the ribs 20 all of which are interrupted at 21, 21. The openings 21 in the length of the ribs leave them in the form of segments, corresponding to the structure seen in Figure 3 and differing therefrom only in the presence of a greater number of the ribs.

Figure 6:
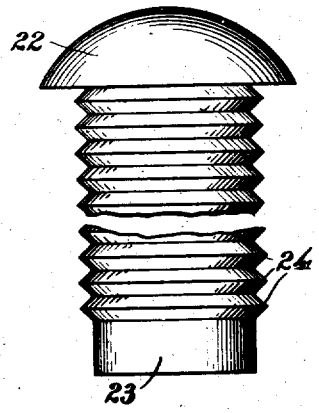

Referring more particularly to Figure 6, the usual driving head 22 is provided on the body of the pin, and at the opposite end the usual pilot 23 with annular ribs 24, 24 disposed transversely of the longitudinal axis of the pin and in numbers sufficient to extend from the pilot 23 to the head 22. Each rib 24, instead of being formed with a flat or horizontal surface at its upper face, is provided with an inclined surface of an opposite inclination to that of the under surface. Thus, while the fastener seen in Figure 6 will function substantially the same as the other structures shown, it possesses less capacity for resistance to a withdrawing strain, and, in fact, is intended to enable withdrawal under sufficient stress. Nevertheless the form of the ribs 24 is such as to insure an overlap of the material engaged which will firmly retain the fastener in position and resist a large amount of withdrawing stress.

In the industrial art of fasteners of the hammer-driven type for anchorage in the harder metals, such as soft iron or soft steel, it has heretofore been proposed to provide frictional engagement of a fastener to metal work by forming ribs, threads or other projections outstanding from the body of a fastener and of sufficiently soft material with respect to the work to be entered that, when the fastener is hammered into the work or into an opening formed in the work of less cross sectional area than that of the ribs, threads, or other projections, the projections will be stripped, rubbed off, or caused to flow inward toward the body of the fastener so that the fastener structure has its material modified in contour without appreciable modification of the surrounding wall of the material of the work. Such method of fastening gives a frictional engagement that for some purposes may be successfully used, but does not give such an anchorage as will resist vibration loosening or resist any substantial withdrawal stress. Whereas, by contrast, the present invention, involving as it does the concept and practice of modifying the contour of the material of the work without substantial or appreciable modification of the material of the fastener, causes the work to assume such a relation to the fastener that the fastener will not vibrate loose and cannot ordinarily be pulled out without severing the overhanging material of the work or breaking the fastener; and in actual practice where the properly proportioned fastener is employed with respect to a given aperture in the harder metals, such as soft iron and soft steel, the fastener having first been sufficiently driven into the work can not be withdrawn by any pulling force exerted on the headed end of the fastener, but will, as indicated by innumerable tests, break in two leaving the inner portion of the fastener anchored in the work.

What is claimed is:

1. A fastener for metal work comprising a pin-like body having a cylindrical pilot at its entering end and a non-spiral, circumferentially disposed outstanding rib having its entering face inclined toward the pilot, the pilot having a flat entering end, and the rib being hardened sufficiently for entering metal work, such as soft iron or soft steel, substantially without injury to the rib.

2. A hammer-driven fastener comprising a cylindrical pin-like body having a series of circumferentially disposed ribs each having a face inclined toward the entering end of the body hardened sufficiently for entering metal such as soft iron and soft steel, substantially without injury to such face, and each of the ribs lying in planes intersecting the axis of the body substantially at right angles, and each of said ribs being interrupted at a plurality of places to form segments, the places of interruption of one rib being alined with those of the adjacent rib for exposing rounded portions of the body elongated in the direction of the length of the body.

3. A fastener comprising a pin-like body having a non-spiral, circumferentially extending anchoring rib, the rib being hardened sufficiently for entering metal work, such as soft iron or soft steel, substantially without injury to the rib.

4. A hammer-driven fastener comprising a pin-like body having a generally circumferentially-extending anchoring rib outstanding from the body with a face inclined toward the entering end of the body and the rib being hardened sufficiently and the pitch of the inclination of the said face of the rib being such as to enable the rib to enter metal, such as soft iron and soft steel, under the action of a hammer blow against the outer end of the body substantially without injury to the rib.

5. In the art of anchorage, the combination of the steps of flowing material of work of the harder metals, such as soft iron or soft steel, substantially radially away from a pin body, and then flowing the said material substantially radially back toward the body to an overhanging position relative to the body of part thereof.

6. In the art of anchorage, the combination of steps as claimed in claim 5 with the step of confining the flowing material substantially against lateral escape from the stresses occasioning the radial movements.

7. In the art of anchorage, the combination of steps as claimed in claim 5 wherein the radial flowing of the material occurs at diametrically opposite places relative to the pin.

8. In the art of anchorage, the combination of steps as claimed in claim 5 wherein the radial flowing of the material occurs substantially at all points about the pin in at least one transverse plane thereof.

9. In the art of anchorage, the combination of steps as claimed in claim 5 wherein the pin is located completely surrounded by the work material to be thus flowed.

10. In the art of anchorage, anchoring a fastener to work comprising the combination of the steps of encircling a fastener body with material of work of the harder metals, such as soft iron or soft steel, and flowing in a substantially unitary mass movement a continuous portion of said material surrounding the fastener first in a direction away from and then toward the body of the fastener to an interlocked engagement with the fastener.

11. In the art of anchorage of fasteners in the harder metals, such as soft iron and soft steel, the combination of the steps of inserting into an opening in such metal work a pin-like fastener body having an outstanding projection, the opening in the work being of as great or greater cross section than the body of the fastener and of less cross section than the body and its outstanding projection, and deforming material of the metal of the work while retaining the projection substantially against deformation while advancing the pin into the work until the projection reaches an anchored condition in the work resisting vibration loosening.

12. In the art of anchorage, the combination of the steps of the flowing material of work of the harder metals, such as soft iron and soft steel, substantially radially away from a pin body, and then flowing the said material substantially radially back toward the body to an overhanging position relative to the body or part thereof, the flowed material comprising a continuous, unbroken undulation surrounding the pin body.

13. In the art of anchorage, forming a substantially cylindrical opening in metal work of the harder metals, such as soft iron or soft steel, introducing into said opening the entering end of a substantially cylindrical pin body, which pin body has a circumferentially disposed rib outstanding from the body and lying in planes intersecting the axis of the body substantially at right angles, the rib having a face inclined toward the entering end of the pin body and hardened sufficiently for entering the harder metals, such as soft iron or soft steel, substantially without injury to such face, the opening in the metal work being of greater diameter than the diameter of the pin body and less diameter than the diameter of the rib, and forcing the pin body longitudinally into the opening sufficiently for causing the inclined face of the rib to engage and flow the material of the surrounding work substantially radially away from the pin body to accommodate the passage of the rib and thereafter causing return flow of material of said work to a position overhanging said rib.

14. In the art of anchorage, forming a substantially cylindrical opening in metal work of the harder metals, such as soft iron or soft steel, introducing into said opening the entering end of a substantially cylindrical pin body, which pin body has a circumferentially disposed rib outstanding from the body and lying in planes intersecting the axis of the body substantially at right angles, the rib having a face inclined toward the entering end of the pin body and hardened sufficiently for entering the harder metals, such as soft iron or soft steel, substantially without injury to such face, the opening in the metal work being of greater diameter than the diameter of the pin body and less diameter than the diameter of the rib, and forcing the pin body longitudinally into the opening sufficiently for causing the inclined face of the rib to engage and flow the material of the surrounding work substantially radially away from the pin body to accommodate the passage of the rib, and thereafter causing return flow of material of said work to a position overhanging said rib, the rib being continuous and uninterrupted, and the flowed metal of the work being similarly uninterrupted.

15. In the art of anchorage, forming a substantially cylindrical opening in metal work, of the harder metals, such as soft iron or soft steel, introducing into said opening the entering end of a substantially cylindrical pin body, which pin body has a circumferentially disposed rib outstanding from the body and lying in planes intersecting the axis of the body substantially at right angles, the rib having a face inclined toward the entering end of the pin body and hardened sufficiently for entering the harder metals, such as soft iron or soft steel, substantially without injury to such face, the opening in the metal work being of greater diameter than the diameter of the pin body and less diameter than the diameter of the rib, and forcing the pin body longitudinally into the opening sufficiently for causing the inclined face of the rib to engage and flow the material of the surrounding work substantially radially away from the pin body to accommodate the passage of the rib, and thereafter causing return flow of material of said work to a position overhanging said rib, the said rib being interrupted and leaving a longitudinal ridge in the material of the work between the spaced ends of the rib.

HEYMAN ROSENBERG.